United States Patent [19]
Dawson

[11] Patent Number: 5,101,910
[45] Date of Patent: Apr. 7, 1992

[54] SEGMENTED SOIL AERATOR ATTACHABLE TO RIDING MOWER

[76] Inventor: Timothy D. Dawson, 1603 Proctor Dr., Scottsboro, Ala. 35768

[21] Appl. No.: 609,468

[22] Filed: Nov. 5, 1990

[51] Int. Cl.[5] .......................................... A01B 45/02
[52] U.S. Cl. ..................................... 172/21; 172/554; 172/297; 180/20
[58] Field of Search ................... 172/21, 22, 554, 569, 172/518, 537, 310, 312, 297, 776; 56/249; 37/231, 247, 258, 223, 224, 283; 15/79.1, 79.2, 82; 404/122, 132, 128, 121, ; 180/20; 280/81.6

[56] References Cited

U.S. PATENT DOCUMENTS

| | | | |
|---|---|---|---|
| 891,954 | 6/1908 | Ross and Deal | 404/121 |
| 1,113,101 | 10/1914 | Chase | 180/20 |
| 1,157,670 | 10/1915 | Boswell | 172/554 |
| 1,696,654 | 12/1928 | Stem et al. | 172/554 |
| 1,858,948 | 5/1932 | Bird | 172/554 |
| 2,159,347 | 5/1939 | Austin | 172/554 |
| 2,229,229 | 1/1941 | Wagner | 37/247 |
| 2,229,230 | 1/1941 | Wagner | 37/247 |
| 2,476,084 | 7/1949 | Cour | 56/249 |
| 2,483,846 | 10/1949 | Roche et al. | 56/249 |
| 2,663,131 | 12/1953 | Johnson | 172/554 |
| 2,912,813 | 11/1959 | Ellsworth | 56/249 |
| 3,422,553 | 1/1969 | Holloway | 37/283 |
| 3,643,746 | 2/1972 | Dedoes | 172/22 |
| 3,650,331 | 3/1972 | Dedoes | 172/21 |
| 3,650,332 | 3/1972 | Dedoes | 172/22 |
| 3,739,857 | 6/1973 | Little | 172/22 |
| 3,794,121 | 2/1974 | Drozak | 172/21 |
| 4,040,761 | 8/1977 | Rahn | 180/20 |
| 4,158,391 | 6/1979 | Clements | 172/22 |
| 4,383,580 | 5/1983 | Huxford | 172/21 |
| 4,619,329 | 10/1986 | Gorbett | 172/21 |
| 4,762,183 | 8/1988 | Bourgault et al. | 172/400 |
| 4,776,904 | 10/1988 | Rogers et al. | 172/21 |
| 4,899,828 | 2/1990 | Harris | 56/249 |
| 4,969,232 | 11/1970 | Michel | 16/DIG. 27 |

FOREIGN PATENT DOCUMENTS 103740  4/1964  Norway .................................. 37/247

Primary Examiner—Randolph A. Reese
Assistant Examiner—Spencer Warnick
Attorney, Agent, or Firm—Phillips & Beumer

[57] ABSTRACT

An aerator device for attachment to the front end of a power riding lawn mower has two features which enable a spiked roller assembly to guide itself smoothly through a desired path and to make turns without excessive digging in of the spikes. The roller assembly includes a plurality, and preferably three, of rollers disposed coaxially on a shaft with each roller being rotatable independently of the others, facilitating turning. Self-tracking of the rollers on a desired path is provided by vertical mounting of a pivot pin connected to the roller assembly in a journal supported by a frame forward of the roller axis. The roller assembly pivots to follow the frame journal without operator intervention when propelled forward.

10 Claims, 3 Drawing Sheets

SEGMENTED SOIL AERATOR ATTACHABLE TO RIDING MOWER

FIELD OF THE INVENTION

This invention relates generally to soil aeration devices and more particularly to aeration devices attachable to the framework of a powered device such as a riding lawn mower.

BACKGROUND OF THE INVENTION

Soil aeration devices are used to penetrate the soil so as to allow the roots of plants to breathe and to simulate decomposition of organic matter. Aeration is particularly helpful in treating lawns that have become thatched or covered with a dense layer of growth or accumulated clippings that prevent the air from coming in contact with the soil. Aerator devices typically have spikes mounted on a rotatable drum or roller, the spikes penetrating the soil when the drum is propelled along the surface.

Various approaches for mounting and arrangement of spiked drums on lawn mowers and tractors are shown in prior patents. U.S. Pat. No. 4,899,828, issued Feb. 13, 1990, to Harris, discloses mounting of a spiked roller on supporting arms extending out past the front of the lawn mower, the support arms being oriented to the ground at an angle between 30 and 60 degrees. This arrangement is said to force the spikes into the ground without use of ballast weights. Other patents, exemplified by U.,S. Pat. No. 2,912,813, issued Nov. 17, 1959, to Ellsworth; U.S. Pat. No. 2,483,846, issued Oct. 4, 1949, to Roche et al.; and U.S. Pat. No. 2,476,084, issued July 12, 1949, to Cour, disclose use of a spiked roller arrangement on reel-type lawn mowers, the rollers replacing or being placed behind the usual roller at the back of such mowers. The Ellsworth patent further shows a roller device having a large number of coaxially aligned smooth roller segments with spiked narrow discs placed between the segments. This allows the rollers and discs to rotate freely in either direction independent of one another and keeps the spikes from digging in when the mower is moved in a curved line. A tractor-mounted device using a plurality of independently mounted, longitudinally spaced-apart roller segments is disclosed in U.S. Pat. No. 3,650,331, issued Mar. 21, 1972, to Dedoes. This structure permits independent vertical movement of the segments relative to one another and provides for better coverage of high and low spots on rough ground.

The prior patents do show an aerator mountable on the front end of the lawn mower of a riding mower in a manner such that the mower may be turned and maneuvered in corner areas without digging in of rollers spikes. It is desired to provide such capability along with enabling a propelled, spiked roller of an aerator device to adjust its own path in a desired direction.

SUMMARY OF THE INVENTION

The present invention is directed to an aerator device for attachment to the front of riding mowers, lawn tractors, and the like. Important features of the invention include a supporting frame attachable to the front end of the mower and providing a vertically disposed receptacle for receiving a pivot pin secured to a structure on which spiked rollers are mounted for rotation. The axis on which the rollers rotate is spaced apart rearwardly from the vertical axis on which the pivot pin of the roller support structure turns. This causes the rollers to track behind the receptacle of the supported frame and to be self-guided in a desired path in front of the mower. A plurality of rollers, preferably three, are disposed coaxially on a shaft for rotation independent of one another, allowing the aerator to make turns without excessive digging in. The combined features of the invention provide a highly effective action, coupled with smooth steering and self-guiding of the rollers. Lifting of the rollers out of engagement with the soil and making turns or covering corner areas is not required. A platform may also be provided on a supporting frame for weighting the device down as required to obtain the desired digging action.

It is, therefore, an object of this invention to provide a spiked roller aerator attachment for a powered vehicle that may be readily propelled through turns and maneuvered in corner areas without lifting the roller off the ground.

Another object is to provide such an aerator having rollers mounted so as to be self-guiding in a desired path without operator intervention.

Yet another object is to provide an aerator that may be readily attached to the front end of a powered riding lawn mower.

Other objects and advantages of the invention will be apparent from the following description and the appended claims.

DESCRIPTION OF THE PREFERRED EMBODIMENT

Figure 1:
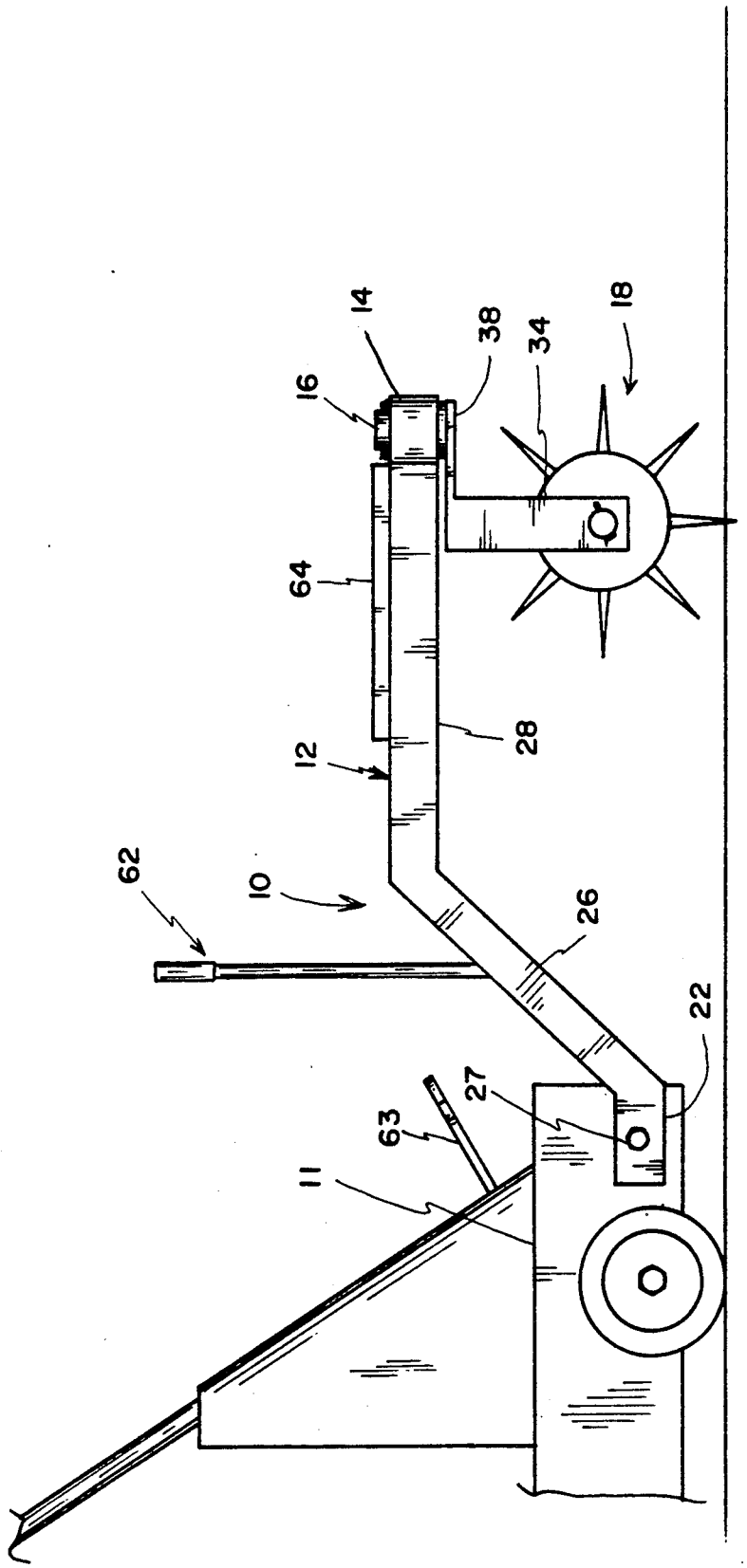
FIG. 1 is a side elevational view of a soil aerator embodying the invention.

Referring to FIG. 1, there is shown an aerator attachment 10 secured to the front end of a riding lawn mower 11 and mounted by means spaced forward of the mower.

Figure 2:
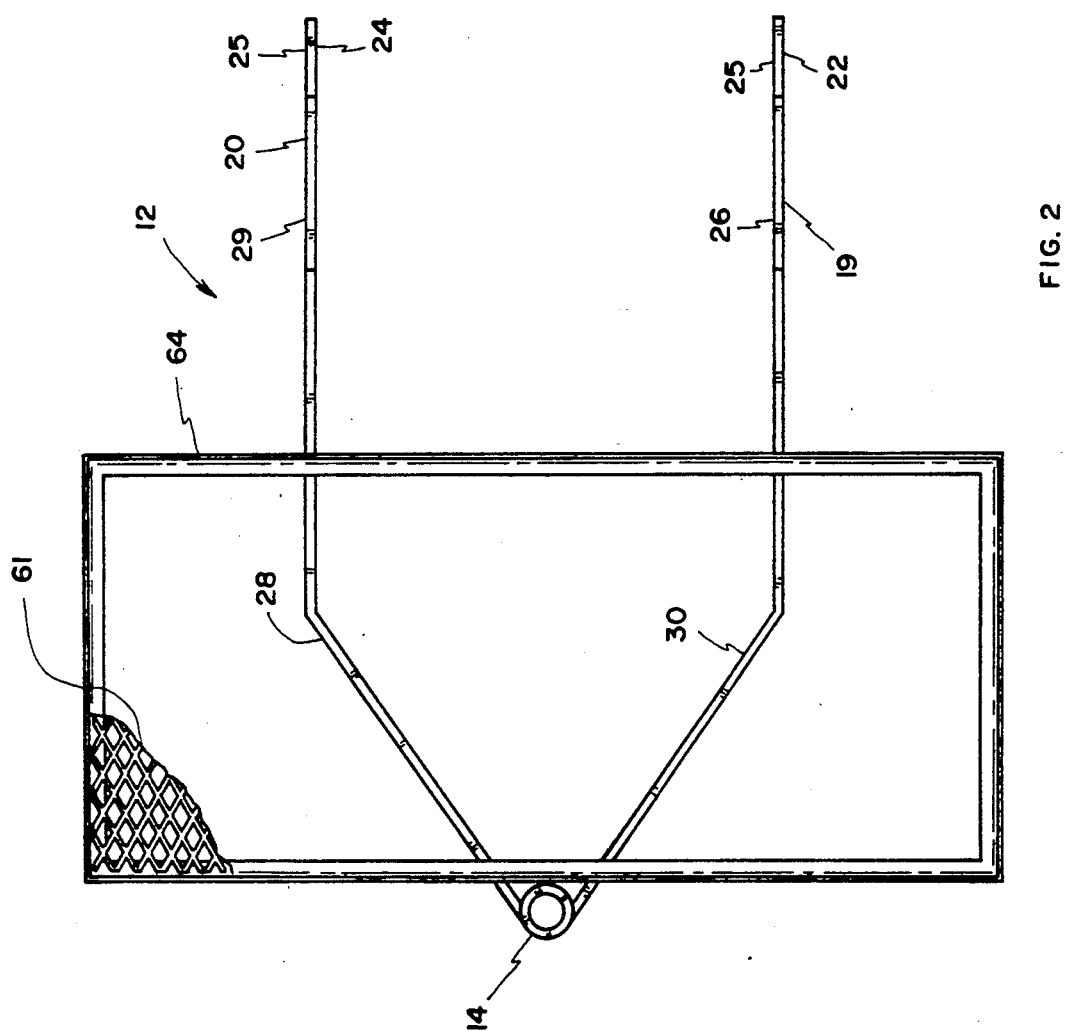
FIG. 2 is a top planar view of the lawn mower-attached supporting frame structure of the aerator.

The attachment includes framework 12 securable to the lawn mower and providing a vertically disposed journal or receptacle 14 for receiving a mating vertically extending pivot pin 16 fixedly secured to roller mechanism 18. Support framework 12 (FIG. 2) includes a pair of opposing side members 19, 20 supported at their rear ends for attachment to opposite front sides of the mower and converging at their front ends where they are connected to a journal 14 for supporting the same. The side members have horizontally disposed rear end regions 22, 24 each having an aperture 25 for receiving a pin 27 for being connected to the lawn mower body on both sides near the front wheels thereof. End regions 22 may be varied in size and structure as required to enable attachment to a particular lawn mower structure. Middle portions 26, 29 of the side members extend upward and forward diagonally connecting the end regions 22 with converging, horizontally disposed forward end regions 28, 30. Forward ends of regions 28 and 30 are secured to a vertically disposed sleeve segment 14 which serves as a journal for receiving pivot pin 16 therein and for pivotally supporting the same.

Figure 3:
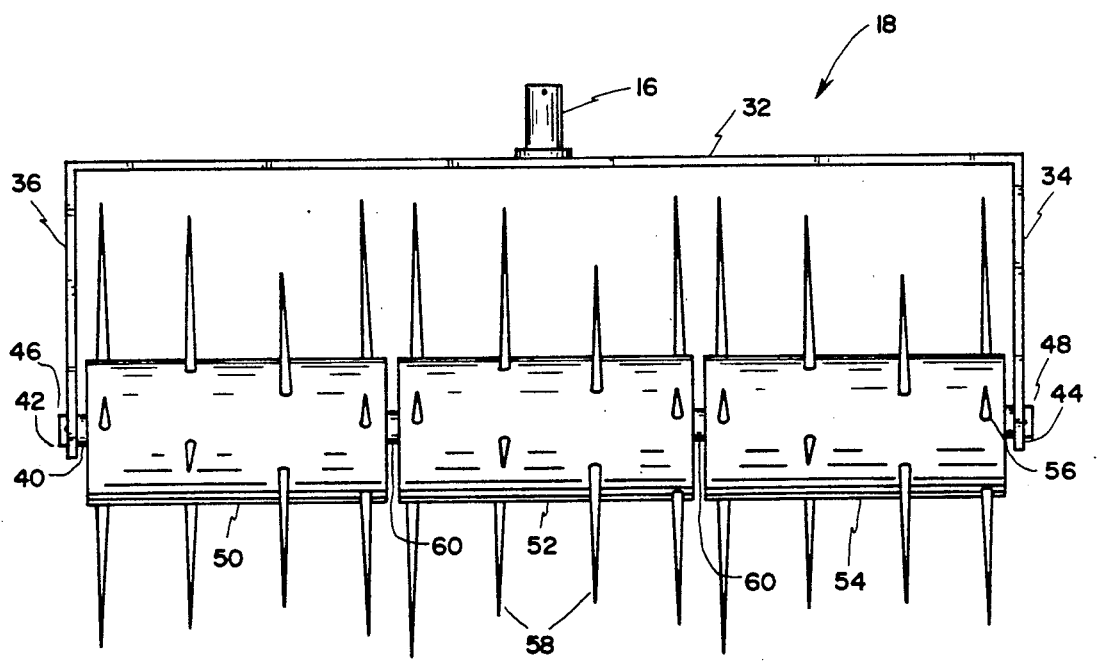
FIG. 3 is a front planar view of the spiked roller of the aerator.

Roller mechanism 18 (FIG. 3) has a U-shaped frame that includes a horizontally disposed top bar 32 and end bars 34, 36 extending vertically downward from the top and at right angles thereto. Top bar 32 is connected to horizontally disposed spacer bar 38 (FIG. 1), which in turn is secured to pivot pin 165 at a right angle thereto. This causes end bars 34, 36 to be spaced apart rearwardly from the axis of pin 16 and facilitates tracking of the roller mechanism along a desired path.

Roller mechanism 18 has a shaft 40 fixedly connected to end bars 34, 36 through apertures 42, 44 and secured by pins 46, 48. Threaded nuts engaging threads on the shaft ends may also be used for this purpose. Rollers 50, 52, and 54 are disposed over shaft 40 for rotation around the shaft, each roller being freely rotatable independent of the other two. Each of the rollers has a generally cylindrical body with an aperture 56 of circular cross section extending axially through the roller for being in placed in mating relation with shaft 40. A plurality of spikes 58 are mounted radially on each of the rollers for engaging the soil while being propelled forward. The spikes preferably have a conical shape wider at the bottom for being secured to the rollers by means such as welding and pointed at their outer ends as required to penetrate the soil. The spikes preferably are arranged in a helical pattern rather than in longitudinal rows to provide smoother operation. Individual rollers are secured in place against movement by spacer washers 60 placed on the shaft at ends of the rollers, the spacers being loosely fitted against the roller ends so as to allow rotational movement around the shaft.

A platform 64 in the form of a rectangular metal tray having an expanded, open mesh layer 61 may be disposed horizontally on top of end regions 28, 30 of support framework 12 in order to provide a location for placement of weights as may be required to cause the spikes to dig into the soil effectively. A capability for lifting the roller so as to disengage it when crossing sidewalks or the like may be provided by a hand-graspable handle 62 secured to the support framework. To facilitate weighting down and lifting up of the framework for these purposes, the framework is arranged to be pivoted up and down around pins 27. The handle 62 is engageable with a hook 63 on the lawn mower to hold the framework in its raised position as desired.

In operation, the aerator roller mechanism 18 tracks behind journal 14, "floating" and adjusting its own path effectively while being propelled through a turn. In corners or other confined areas out of reach in normal turning, the mower may be backed up and propelled back and forth as required.

The above-described embodiment is merely illustrative and is not to be construed as limiting the scope of the invention, which is limited only as indicated by the appended claims.

I claim:

1. An aerator device for attachment to a powered vehicle comprising:
    a frame attachable to the front of said vehicle and supporting in spaced-apart relation from the vehicle a vertically disposed journal, said frame comprising a pair of side members each having a forward end and a rearward end, said rearward ends being separated from one another and arranged for connection of one of said rearward ends to a first front corner of the vehicle, and the other of said rearward ends being arranged for connection to a second front corner of the vehicle, said side members extending upward and forward from their rearward ends and converging with one another in position to support said journal; and
    a roller assembly comprising:
        a shaft,
        a plurality of independently rotatable rollers mounted coaxially with respect to one another on said shaft, said rollers having spikes connected thereto and extending radially outward,
        means supporting said shaft in a horizontal position,
        a vertically extending pivot pin engageable with said journal for pivoting therein, and
        means connecting said shaft supporting means to said pivot pin including a spacer extending rearwardly from said pivot pin;
        whereby said roller assembly may be guided into a desired path upon being propelled forward and may track behind said journal, maintaining it alignment by pivoting of said point in said journal.

2. An aerator device as defined in claim 1 wherein said side members each include a horizontally disposed portion adjacent to their rear ends, a middle portion disposed diagonally upward, and a horizontally disposed portion adjacent to their front ends.

3. An aerator device as defined in claim 1 wherein said means connected said shaft supporting means to said pivot pin includes a pair of vertically disposed, spaced-apart arms connected at their upper ends to a horizontally disposed cross member and at their lower ends each one thereof being coupled to one end of said shaft.

4. An aerator device as defined in claim 3 wherein said spacer comprises a horizontally disposed bar secured at its rearward end to said cross member and having its forward end secured to said pivot pin.

5. An aerator device as defined in claim 4 wherein said frame is pivotally attachable to said front end of said vehicle by means allowing upward and downward movement of said frame, enabling the frame to be lifted up or weighted down.

6. An aerator device as defined in claim 5 including handle means attached to said frame and accessible to a vehicle operator for lifting the frame slightly upward.

7. An aerator device as defined in claim 5 including a platform disposed horizontally on said frame for placement of weights thereon.

8. An aerator device as defined in claim 7 wherein said roller assembly includes three rollers.

9. An aerator device as defined in claim 8 including spacer washers disposed between adjacent ends of said rollers.

10. An aerator device as defined in claim 9 wherein said vehicle is a riding lawn mower.

* * * * *